000
United States Patent [19]

Sawaya et al.

[11] Patent Number: 4,745,621
[45] Date of Patent: May 17, 1988

[54] METHOD OF AND APPARATUS FOR DETECTING MINIMUM BIT NUMBER OF RECEIVED DATA

[75] Inventors: Hajime Sawaya; Yoshinobu Fukuda; Hiroyuki Sato, all of Tokyo, Japan

[73] Assignee: Ando Electric Co., Ltd., Tokyo, Japan

[21] Appl. No.: 914,685

[22] Filed: Oct. 2, 1986

[30] Foreign Application Priority Data

Oct. 4, 1985 [JP] Japan ................... 60-220297

[51] Int. Cl.[4] .............................. H03K 9/06
[52] U.S. Cl. ................... 375/10; 340/825.65; 375/21
[58] Field of Search ............ 375/10, 21, 111; 324/78 R, 78 D; 328/151; 307/353; 340/825.65

[56] References Cited

U.S. PATENT DOCUMENTS 4,001,504  1/1977  Hendrickson ................ 375/116
4,377,006  3/1983  Collins et al. ................. 375/21

Primary Examiner—Benedict V. Safourek
Attorney, Agent, or Firm—Flynn, Thiel, Boutell & Tanis

[57] ABSTRACT

Received data is sampled with a sampling pulse of a rate m greater than that n of the received data, and a minimum bit number of the received data is determined from a sampled output for estimating a signal transfer rate of the received data. The present method and apparatus can be applied to received data not involving a timing signal.

6 Claims, 1 Drawing Sheet

METHOD OF AND APPARATUS FOR DETECTING MINIMUM BIT NUMBER OF RECEIVED DATA

BACKGROUND OF THE INVENTION

1. Field of the Invention

The present invention relates to a method of and an appartus for detecting a minimum bit number from received data which can be used for estimating a signal transmission rate of the received data even without any timing signal in the received data in data communication.

2. Description of the Prior Art

A data signal in data communication generally includes a timing signal which enables one to estimate a signal transmission rate of a received data.

However, there are data signals not involving such a timing signal, which make difficult estimation of a signal transmission rate thereof.

SUMMARY OF THE INVENTION

In view of the drawbacks of such prior techniques, it is an object of the present invention to provide a method of and an apparatus for detecting a minimum bit number from the received data which can be used for estimating a signal transmission rate of received data even when a data signal not involving a timing signal is received.

To achieve the above objects, the method of estimating a signal transmission rate of received data according to the present invention employs a sampling signal having a frequency or rate greater than that of the received data.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
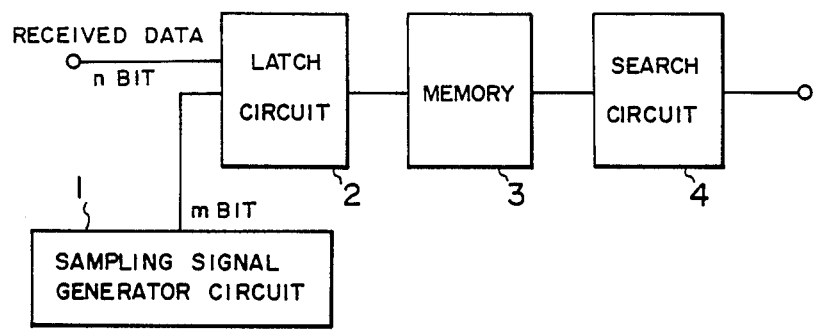
FIG. 1 is a schematical block diagram illustrating a method of and an apparatus for detecting a minimum bit number according to an embodiment of the present invention.
Figure 2:
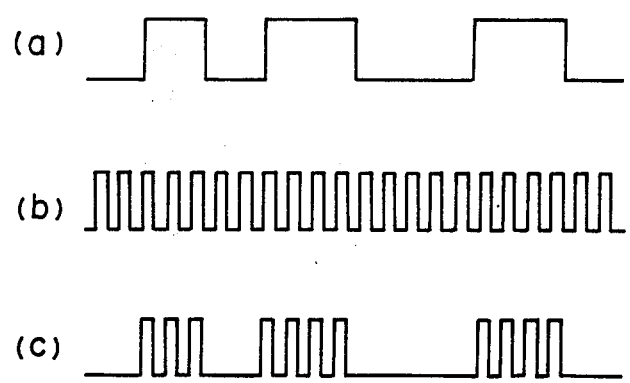
FIG. 2 is a timing diagram for the embodiment of FIG. 1.

Referring to FIGS. 1 and 2, an embodiment according to the present invention will be described.

As shown in FIG. 1, which shows a preferred embodiment, designated at 1 is a sampling signal generator circuit, 2 is a latch circuit, 3 is a memory, and 4 is a search circuit.

The sampling signal generator circuit 1 generates a sampling signal of m bits per second.

The latch circuit 2 samples received data with an output pulse from the sampling signal generator circuit 1.

Thereupon, the transmission rate of the received data of n bits per second must satisfy a relation $m >> n$.

For example, when the rate n of received data is 9600 bits/sec, the rate m of the sampling signal is made to be about 150 kbits/sec.

The memory 3 serves to temporarily store the output from the latch circuit 2.

The search circuit 4 searches for a state of repetition of the same data from data stored in the memory 3 for detecting a minimum bit number.

In succession, wave forms at respective portions of FIG. 1 are shown in FIG. 2.

FIG. 2 (a) is a wave form of received data, and FIG. 2 (b) is an output wave form from the sampling signal generator circuit 1.

FIG. 2 (c) is an output wave form of the latch circuit 2, which provides only portions of "1" of the received data.

The signal output of FIG. 2 (c) is stored in the memory 3 as "1" at positions where the signal is present and as "0" where it is not present.

Let us here suppose the following signal output, for example, in FIG. 2 (c).

"0000111111111100000000
000000000000011111111110
000000001111100000000"

The signal comprises four "0s", nine "1s", twenty "0s", nine "1s", nine "0s", five "1s", and eight "0s", in order.

The search circuit 4 of FIG. 1 compares in succession the outputs from the memory 3 and leaves behind those having a minimum bit number.

In the above example, the number of bits of the signal changes as 4 - 9 - 20 - 9 - 9 - 5 - 8, and a minimum bit number is 5 except for the first number 4.

The present invention judges the minimum bit number of the exemplary signal at the sampling rate as being five. Since the sampling rate is previously known, it is possible to find a signal transmission rate of the received data.

Furthermore, there are sometimes occasions where a plurality of received data are provided and signal transmission rates thereof are previously known, but where it is unclear to which received data each of the transmission rates corresponds. Thereupon, sampling pulses of the bit number corresponding to the received data may be issued from the search circuit 4 for judging the received data in concern.

According to the present invention, as described above, received data is sampled with sampling rate m being greater than the transmission rate n of the received data, and a minimum bit number is determined based on the sampled output for estimating a signal transmission rate of the received data. Accordingly, even a signal transmission rate of received data not involving a timing signal can be found.

Although a certain preferred embodiment has been shown and described, it should be understood that many changes and modifications may be made therein without departing from the scope of the appended claims.

What is claimed is:

1. A method of detecting a minimum bit number from a received digital signal generated by serially transmitting a plurality of bits at a bit transmission rate, comprising the steps of: sampling said digital signal at a predetermined sampling rate which is substantially greater than said bit transmission rate to thereby obtain a plurality of successive digital data samples, and searching said data samples so as to determine a value which is the minimum number of successive identical data samples, said value being said minimum bit number.

2. The method of claim 1, including after said sampling step and prior to said searching step the step of storing said plurality of data samples.

3. The method of claim 1, including after said searching step the step of dividing said sampling rate by said minimum bit number to produce a value which is an estimate of said transmission rate of said digital signal.

4. An apparatus for detecting a minimum bit number from a received digital signal generated by serially transmitting a plurality of bits at a bit transmission rate, including: sampling means for sampling said digital signal at a predetermined sampling rate which is substantially greater than said bit transmission rate to thereby obtain a plurality of successive digital data samples, and searching means for searching said data samples so as to determine a value which is the minimum number of successive identical data samples, said value being said minimum bit number.

5. The apparatus of claim 4, including memory means for storing said plurality of data samples from said sampling means, said searching means searching the data samples stored in said memory means.

6. The apparatus of claim 4, wherein said sampling means includes a sampling signal generating means for generating a sampling signal having a frequency equal to said sampling rate, and latch means controlled by said sampling signal and having said digital signal applied to an input thereof.

* * * * *